United States Patent
Kato et al.

(10) Patent No.: US 8,684,880 B2
(45) Date of Patent: Apr. 1, 2014

(54) RATTLING NOISE REDUCTION DEVICE FOR VEHICLE

(75) Inventors: Hajime Kato, Susono (JP); Masato Terashima, Mishima (JP); Hiroki Kuwamoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 136 days.

(21) Appl. No.: 13/255,529

(22) PCT Filed: Mar. 11, 2009

(86) PCT No.: PCT/JP2009/054613
§ 371 (c)(1),
(2), (4) Date: Sep. 9, 2011

(87) PCT Pub. No.: WO2010/103625
PCT Pub. Date: Sep. 16, 2010

(65) Prior Publication Data
US 2011/0319212 A1   Dec. 29, 2011

(51) Int. Cl.
*F16H 37/08* (2006.01)
*B60W 10/18* (2012.01)

(52) U.S. Cl.
USPC ............. 475/204; 475/5; 475/206; 192/219.5

(58) Field of Classification Search
USPC ...................... 475/5, 204, 206; 192/219.5
See application file for complete search history.

(56) References Cited

U.S. PATENT DOCUMENTS

| 4,519,483 A | 5/1985 | Schlicker |
| 5,964,335 A * | 10/1999 | Taniguchi et al. ......... 192/219.5 |
| 2003/0045988 A1 | 3/2003 | Suzuki et al. |

FOREIGN PATENT DOCUMENTS

| JP | 51 160822 | 12/1976 |
| JP | 58 99819 | 6/1983 |
| JP | 8 145075 | 6/1996 |
| JP | 10 100872 | 4/1998 |
| JP | 2002 213581 | 7/2002 |
| JP | 2003 74689 | 3/2003 |
| JP | 2007 113653 | 5/2007 |
| JP | 2008 267486 | 11/2008 |

OTHER PUBLICATIONS

International Search Report issued May 19, 2009 in PCT/JP09/054613 filed Mar. 11, 2009.

* cited by examiner

*Primary Examiner* — Derek D Knight
(74) *Attorney, Agent, or Firm* — Oblon, Spivak, McClelland, Maier & Neustadt, L.L.P.

(57) ABSTRACT

A simply structured rattling noise reduction device for a vehicle capable of preventing rattling certainly under neutral position. The rattling noise reduction device is applied to a vehicle having a transmission mechanism configured to transmit a torque of a prime mover to an output member through a mating transmission mechanism, and a shifting means capable of selecting a drive position in which the torque of the prime mover is transmitted to the output member and a neutral position in which the torque of the prime mover is not transmitted to the output member, and in which the transmission mechanism is configured to idle any one of rotary members thereof to prevent the torque from being applied to the output member in case the neutral position is selected. The rattling noise reduction device comprises a slidable contact means, which is contacted frictionally with the output member, or with a rotary member and transmitting the torque to the output member, or with a member integrated with the rotary member and, in case the neutral position is selected by operating the shifting means.

9 Claims, 3 Drawing Sheets (a)

(b)

(c)

RATTLING NOISE REDUCTION DEVICE FOR VEHICLE

TECHNICAL FIELD

The present invention relates to a noise reduction device for a vehicle, and more particularly, to a device for reducing a rattling noise under a neutral stage in which a prime mover is driven but a torque is not applied to an output member.

BACKGROUND ART

A large number of mating components such as gears are used in a transmission mechanism of a vehicle configured to transmit a torque from a prime mover such as an internal combustion engine to a wheel. For example, a geared transmission is formed by a plurality of gear pairs and planetary gear mechanisms, and the geared transmission thus structured is configured to carry out a speed change operation by changing a power transmission route using an engagement device such as a clutch. Meanwhile, in a hybrid vehicle, an engine and an electric motor are connected with a planetary gear mechanism adapted to perform a differential action, and a rotational speed of the engine is controlled by changing a rotational speed of a reaction element of the planetary gear mechanism using the electric motor.

However, in the vehicle, the engine is kept being rotated even when the vehicle is being stopped, and in this situation, the gears are being engaged in the transmission mechanism. In the mechanism thus configured to transmit the torque by engaging the gearing mechanisms, the gears are still allowed to rotate relatively in the amount of backlash even under the situation in which the torque is not applied thereto. Therefore, in case the engine of the stopping vehicle is kept driven but the torque is not applied to the transmission mechanism, the gears of the transmission mechanism are vibrated and hit against another gear meshing therewith. Consequently, a rattling noise occurs in the transmission mechanism.

For example, Japanese Patent Laid-Open No. 8-145075 discloses a gear transmission device, in which a synchronizer ring used in a manual transmission is contacted frictionally with a driven gear to which torque is not being applied by moving the synchronizer ring in an axial direction. Under the neutral stage, a rotational speed of an input shaft becomes larger than that of an output shaft. Therefore, according to the teachings of Japanese Patent Laid-Open No. 8-145075, a predetermined rotary member on the output shaft is pushed in the axial direction utilizing such a speed difference, and the synchronizer ring is pushed by the predetermined rotary member to be contacted frictionally with the driven gear to which the torque is not being applied. In this situation, a braking torque is slightly applied to the driven gear. For this reason, vibrations and rattling of the driven gear can be reduced.

Thus, the gear transmission device taught by Japanese Patent Laid-Open No. 8-145075 is configured to utilize the frictional force of the synchronizer ring. Therefore, the gear transmission device taught by Japanese Patent Laid-Open No. 8-145075 is capable of reducing the rattling of the manual transmission, however, the gear transmission device taught by Japanese Patent Laid-Open No. 8-145075 cannot be applied to a vehicle which is not provided with a manual transmission. As described, in the known hybrid vehicle, the (internal combustion) engine and the electric motor are connected with the differential mechanism comprising three rotary elements such as a planetary gear mechanism, and an output element of the differential mechanism is connected with the output member through a gear to output the torque therefrom to the driving wheel. According to the hybrid vehicle thus structured, the neutral stage is established by idling the electric motor, and under the neutral stage thus established, the torque is not applied to the output member and the drive wheel. That is, in the hybrid vehicle, the engine is connected with the output member or the drive wheel in a manner to transmit the torque thereto even under the neutral stage as in the case of running the vehicle. In other words, under the neutral stage of the hybrid vehicle, the electric motor is idled and the torque thereof will not be applied to the output member and the drive wheel. This means that a power transmitting condition of a power transmission route from the engine to the drive wheel will not be changed in both drive stage and neutral stage. Therefore, in the hybrid vehicle, the gears on the power transmission route are vibrated by a fluctuation in the engine torque, and this makes a rattling noise. As described, the aforementioned synchronizer ring cannot be applied to a drive unit of the hybrid vehicle, therefore, the teachings of Japanese Patent Laid-Open No. 8-145075 cannot be applied to the hybrid vehicle to reduce vibrations and rattling of the gears.

DISCLOSURE OF THE INVENTION

The present invention has been conceived noting the technical problems thus far described, and particularly noting a fact that a neutral stage is established manually by a driver. Therefore, an object of the present invention is to provide a rattling noise reduction device capable of reducing a rattling of a case in which the neutral position is selected.

In order to achieve the above-mentioned object, according to the present invention, there is provided a rattling noise reduction device for a vehicle having a transmission mechanism configured to transmit a torque outputted from a prime mover to an output member through a mating transmission mechanism, and a shifting means adapted to select a drive position in which the torque outputted from the prime mover is transmitted to the output member and to select a neutral position in which the torque outputted from the prime mover is not transmitted to the output member, in which the transmission mechanism is configured to idle any one of rotary members thereof to prevent the torque from being applied to the output member in case the neutral position is selected, characterized by comprising: a slidable contact means, which is contacted frictionally with the output member, or with a rotary member transmitting the torque to the output member, or with a member integrated with the rotary member, in case the neutral position is selected by operating the shifting means.

Specifically, the shifting means includes a means adapted to select a parking position for keeping the vehicle stopped. The rattling noise reduction device of the present invention further comprises a parking mechanism having a parking gear which is rotated together with the rotary member, and a locking member which is moved toward the parking gear to be engaged therewith in a manner to halt a rotation of the parking gear by selecting the parking position. In addition, the slidable contact means includes a friction member which is attached to the locking member, and which is contacted frictionally with the rotary member or the member integrated therewith, in case the neutral position is selected and the locking member is thereby moved.

The locking member is moved to different positions depending on if the shift position selected by the shifting means is the drive position, the neutral position, or the parking position. The aforementioned frictional member includes an annular member, which is fitted loosely onto the rotary member in a manner to be contacted with the rotary member in case the neutral position is selected so that the locking member is moved to a predetermined position, and in a manner not to be contacted with the rotary member in case the drive position is selected so that the locking member is moved to another predetermined position.

As described, the shifting means includes a means adapted to select a parking position for keeping the vehicle stopped, and the rotary member includes a parking gear having an engagement recess which is rotated together with the output member. The rattling noise reduction device of the present invention further comprises a locking member having a protrusion, which is moved toward the parking gear thereby inserting the protrusion into the engagement recess in case the parking position is selected. As also described, the locking member is moved to different positions depending on if the shift position selected by the shifting means is the drive position, the neutral position, or the parking position. The aforementioned slidable contact means includes an annular member, which is attached to a leading end of the protrusion of the locking member while being fitted loosely onto the parking gear, in a manner to be contacted with the rotary member in case the neutral position is selected so that the locking member is moved to a predetermined position, and in a manner not to be contacted with the rotary member in case the drive position is selected so that the locking member is moved to another predetermined position.

The annular member is pushed partially into the engagement recess by the protrusion in the event that the protrusion is inserted into the engagement recess.

Specifically, according to the rattling noise reduction device of the present invention, the annular member includes a rubber ring.

The prime mover includes an internal combustion engine. Meanwhile, the aforementioned mating transmission mechanism comprises: a differential mechanism configured to perform a differential action among an input element connected with the internal combustion engine, and a reaction element and an output element connected with a first electric motor; and a gear for transmitting the torque from the output element to the output member.

The rattling noise reduction device according to the present invention further comprises: a second electric motor; and a gear mechanism arranged between the second electric motor and the output element.

Specifically, the gear mechanism includes a speed reducing mechanism configured to amplify torque of the second electric motor, and to transmit the amplified torque to the output element.

More specifically, the speed reducing mechanism includes a planetary gear mechanism in which a carrier thereof is fixed to a casing.

According to the rattling noise reduction device of the present invention, both of the electric motors are idled in case the neutral position is selected.

Thus, according to the present invention, the prime mover is connected with the output member even in case the neutral position is selected. Therefore, a rotational phase of any of the rotary members of the transmission mechanism is changed by vibrations resulting from a fluctuation in the torque of the prime mover, and consequently, the rotational member is vibrated in its rotational direction. However, according to the rattling noise reduction device of the present invention, the slidable contact member is frictionally contacted with the rotary member or the member integrated therewith in conjunction with a shifting operation to select the neutral position. As a result, rotational vibrations of the rotary member to which the torque is not being applied is reduced or damped. For this reason, rattling resulting from a collision of the rotary member against another member engaged therewith can be reduced or damped.

As described, according to the present invention, the locking member is moved by operating the shifting means, and in case the neutral position is selected, the friction member is contacted frictionally with the rotary member or the member integrated therewith by the locking member. Therefore, the rattling is reduced or damped. Moreover, since the rattling noise reduction device of the present invention is configured to reduce the rattling utilizing the existing parking mechanism, the structure thereof can be simplified entirely.

According to the present invention, the annular member is not contacted with the rotary member under the driving position. However, the annular member is contacted frictionally with the rotary member when the neutral position is selected. As a result, the above explained advantage can be achieved, that is, rotational vibrations of the rotary member to which the annular member is contacted is reduced or damped.

In addition, the above-explained annular member is attached to the locking member to be engaged with the recess of the parking gear, and the annular member is contacted frictionally with the parking gear in case the neutral position is selected. Therefore, as described above, the rattling can be reduced or damped.

Meanwhile, in case the parking position is selected, the annular member is partially pushed into the engagement recess formed on the parking gear by the protrusion of the locking member to be interposed therebetween. Therefore, in addition to the above-explained advantages, the protrusion can be prevented from being contacted directly with an inner face of the engagement recess even if the torque is applied to the parking gear intermittently. For this reason, the rattling can be reduced or damped even under the parking position.

In addition, according to the present invention, the rubber ring is used to serve as the annular member. Therefore, a total cost of the rattling noise deduction device can be reduced.

Thus, according to the present invention, the rattling noise of the hybrid vehicle under the neutral position can be reduced or damped effectively.

BEST MODE FOR CARRYING OUT THE INVENTION

Figure 2:
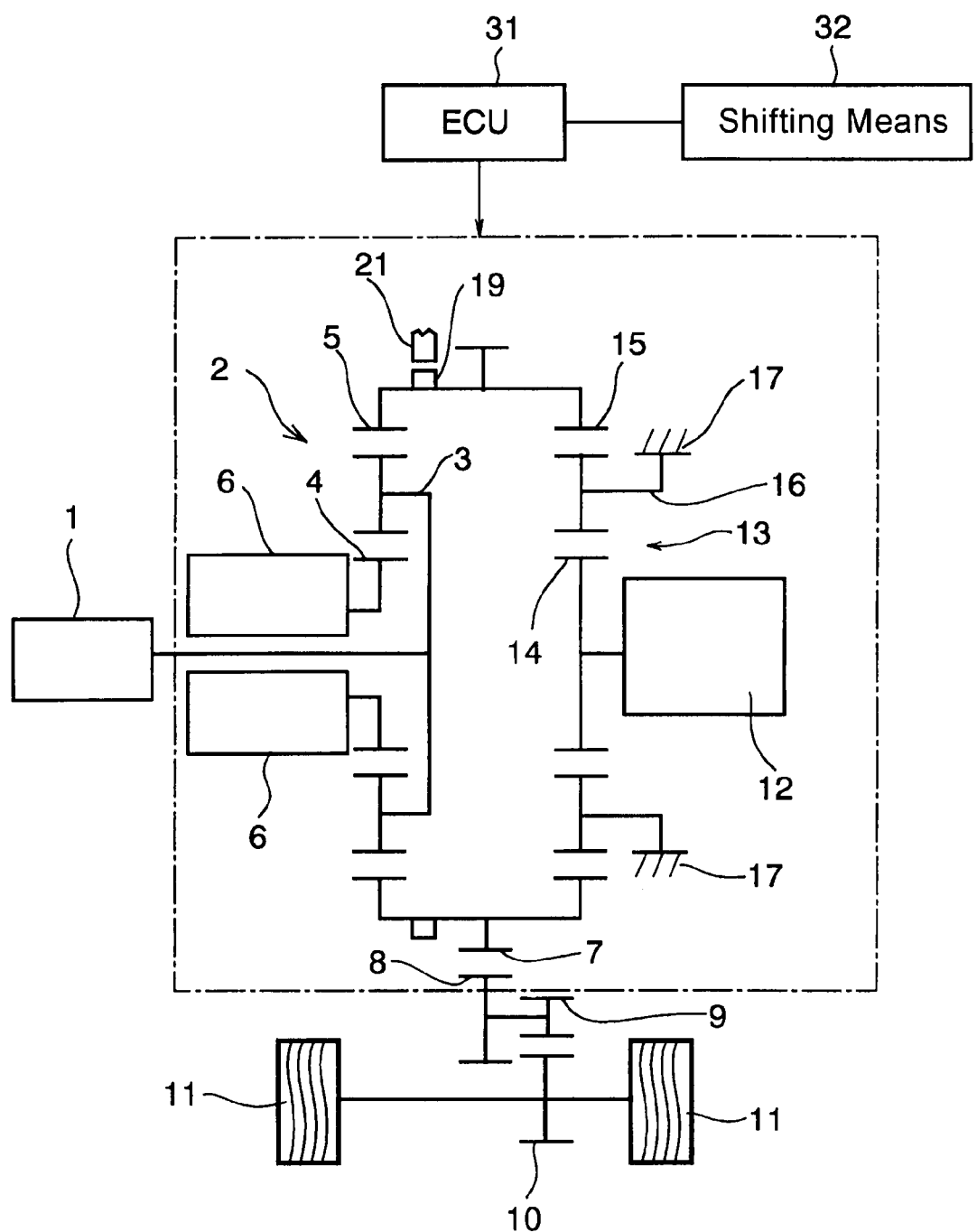
FIG. 2 is a view schematically showing a power transmission system of the hybrid vehicle to which the present invention is applied.

Next, an example the present invention will be explained hereinafter. In a vehicle to which the present invention is applied, a torque outputted from a prime mover is transmitted to an output member through a mating type transmission, and the torque thus transmitted to the output member is further transmitted to a drive wheel. For example, the prime mover is an internal combustion engine such as a gasoline engine and a diesel engine. In addition to the internal combustion engine, a hybrid vehicle further comprises an electric motor, and a torque outputted from the electric motor is transmitted to the drive wheel through the output member together with the torque outputted from the internal combustion engine depending on a driving condition. A power train of the hybrid vehicle is schematically shown in FIG. 2, and the hybrid vehicle shown therein is provided with two sets of electric motors.

Generally, a gear mechanism is used as the mating transmission mechanism. Alternatively, a chain mechanism may also be used as the mating transmission mechanism, and in addition, a spline may be interposed partially. That is, the mating transmission mechanism is a mechanism configured to transmit the torque using a pair of members engaging with each other. The transmission mechanism comprising a mechanism capable of interrupting a torque transmission such as a clutch and a hydraulic transmission (i.e., a torque converter) may be used in the hybrid vehicle. However, the rattling noise reduction device according to the present invention exerts a noise reduction effect thereof more effectively in case of being applied to the vehicle using a transmission mechanism configured to connect the prime mover with the output member constantly, that is, using a transmission without having the mechanism capable of interrupting the torque transmission. In the transmission mechanism of this kind, a neutral stage is established by idling any of the rotary members thereby interrupting a torque transmission to the output member. An example of a hybrid drive unit comprising this kind of transmission mechanism is shown in FIG. 2.

Here will be explained a structure of the power train of the hybrid vehicle shown in FIG. 2. An output shaft of an engine 1 functioning as the prime mover is connected with a carrier 3 of a planetary gear mechanism 2 forming a power distribution mechanism. In the example shown in FIG. 2, a single pinion type planetary gear mechanism is used to serve as the planetary gear mechanism 2. Specifically, in the planetary gear mechanism 2, a ring gear 5 as an internal gear is arranged concentrically with a sun gear 4, and a pinion gear meshing with the sun gear 4 and the ring gear 5 is held by the carrier 3 in a rotatable and revolvable manner. In addition, a first electric motor 6 is connected with the sun gear 4. That is, the carrier 3 serves as an input element, the sun gear 4 serves as a reaction element, and the ring gear 5 serves as an output element. Here, the first electric motor 6 is capable of generating electric power, therefore, the first electric motor 6 will be called a first motor generator 6 in the following explanation.

A counter drive gear 7 as an external gear is integrated with the ring gear 5, and engaged with a counter driven gear 8 as a part of the output member of the present invention. Meanwhile, an output gear 9 is arranged coaxially with the counter driven gear 8 in a manner to rotate integrally therewith, and engaged with a ring gear 10 of a (not shown) differential. Therefore, the torque is transmitted to both of drive wheels 11 via the differential.

The hybrid vehicle shown in FIG. 2 further provided with a second electric motor 12, which is adapted to apply a torque thereof to the counter drive gear 7, and to carry out regeneration of energy. The second electric motor 12 is also capable of generating electric power as the aforementioned first motor generator 6, therefore, the second electric motor 12 will be called a second motor generator 12 in the following explanation. Specifically, the second motor generator 12 is connected with the counter drive gear 7 through a speed reducing mechanism 13. In the example shown in FIG. 2, specifically, the speed reducing mechanism 13 is a single pinion type planetary gear mechanism.

Specifically, in the speed reducing mechanism 13, a ring gear 15 as an internal gear is arranged concentrically with a sun gear 14 as an external gear, and a pinion gear meshing with the sun gear 14 and the ring gear 15 is held by the carrier 16 in a rotatable manner. In addition, the second motor generator 12 is connected with the sun gear 14, and the ring gear 15 is connected with the counter drive gear 7 in a manner to rotate integrally therewith. Meanwhile, the carrier 16 is connected fixedly with a fixing portion such as a casing 17 through a spline (not shown).

In the drive unit shown in FIG. 2, therefore, the power outputted from the engine 1 is transmitted to the carrier 3 of the planetary gear mechanism 2 functioning as the power distribution mechanism, and distributed to the sun gear 4 and to the ring gear 5. In this situation, a negative torque is applied to the sun gear 4 by operating the first motor generator 6 as a generator. As a result, the torque of the engine 1 is applied to the ring gear 5 and the counter drive gear 7 integrated therewith while being amplified.

Meanwhile, an electric power generated by the first motor generator 6 is supplied to the second motor generator 12 thereby driving the second motor generator 12 as a motor. A torque of the second motor generator 12 is transmitted to the ring gear 5 and the counter drive gear 7 integrated therewith while being amplified by the speed reducing mechanism 13. Therefore, a total torque of: the engine torque amplified by the power distribution mechanism; and the torque of the second motor generator 12 amplified by the speed reducing mechanism 13, is transmitted from the counter drive gear 7 to the counter driven gear 8. In this situation, rotational speeds of the carrier 3 and the engine 1 connected therewith are changed by changing a rotational speed of the sun gear 4 by the first motor generator 6. Therefore, the rotational speed of the engine 1 can be optimized by the first motor generator 6 to improve fuel economy.

As described, in the drive unit shown in FIG. 2, the power train from the engine 1 to the drive wheel 11 is always connected entirely. Therefore, the neutral stage is established by releasing the torque from any of the rotary members. Specifically, the neutral stage is established by idling any of the first and the second motor generators 6 and 12 by interrupting electric activity thereof. As a result, the torque outputted from the engine 1 is released from the sun gear 4 of the power distribution mechanism or from the sun gear 14 of the speed reducing mechanism 13. Therefore, the torque is not applied to the counter drive gear 7 and the counter driven gear 8 functioning as the output member, and the neutral stage is thereby established.

In order to hold the drive wheel 11 in case of parking the vehicle, the hybrid vehicle is further provided with a parking mechanism 18. As a parking mechanism used in a conventional automatic transmission, the parking mechanism 18 is configured to halt a rotation of the output member or a member connected therewith by connecting those members with a fixing member using a mechanical means. In the example shown in FIG. 2, the parking mechanism 18 is configured to halt a rotation of the counter drive gear 7. For this purpose, a parking gear 19 is integrated with the aforementioned ring gear 5 or with the counter drive gear 7. Specifically, the parking gear 19 is a rotary member, and teeth are formed on its outer circumferential face at wider pitch than that of basic gears. Therefore, each clearance between the teeth serves as an engagement recess 20. An example of the parking gear 19 is schematically shown in FIG. 3.

Figure 3:
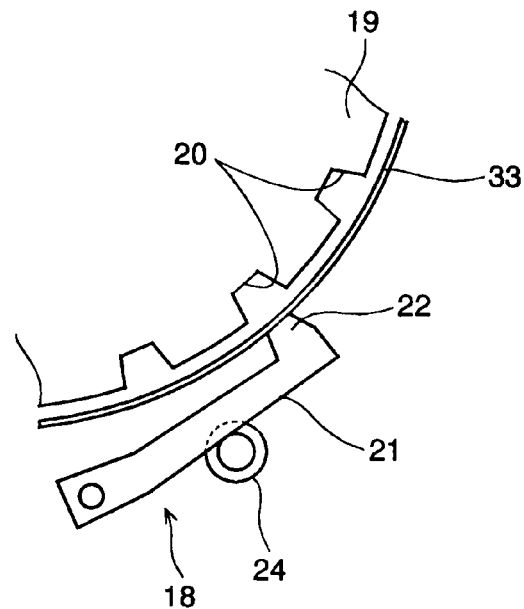
FIG. 3 is a partial view showing a parking gear and a parking pawl.

As shown in FIG. 3, a parking pawl 21 is arranged on an outer circumferential side of the parking gear 19. Specifically, the parking pawl 21 is a locking member configured to halt a rotation of the parking gear 19. For this purpose, the parking pawl 21 is provided with a protrusion 22 to be engaged with the engagement recess 20. That is, the parking pawl 21 is configured to halt the rotation of the parking gear 19 by inserting the protrusion 22 into the engagement recess 20 when moved toward the parking gear 19, and to allow the parking gear 19 to rotate by withdrawing the protrusion 22 from the engagement recess 20 when isolated from the parking gear 19. For this purpose, the parking pawl 21 may be configured to be moved toward the parking gear 19 and away from the parking gear 19 in parallel with the parking gear 19. Alternatively, as shown in FIG. 3, the parking pawl 21 may also be fixed pivotally to a fixing portion at one of end portions thereof. In any case, the parking pawl 21 is pushed elastically by a not shown spring in a direction to be isolated from the parking gear 19.

Figure 4:
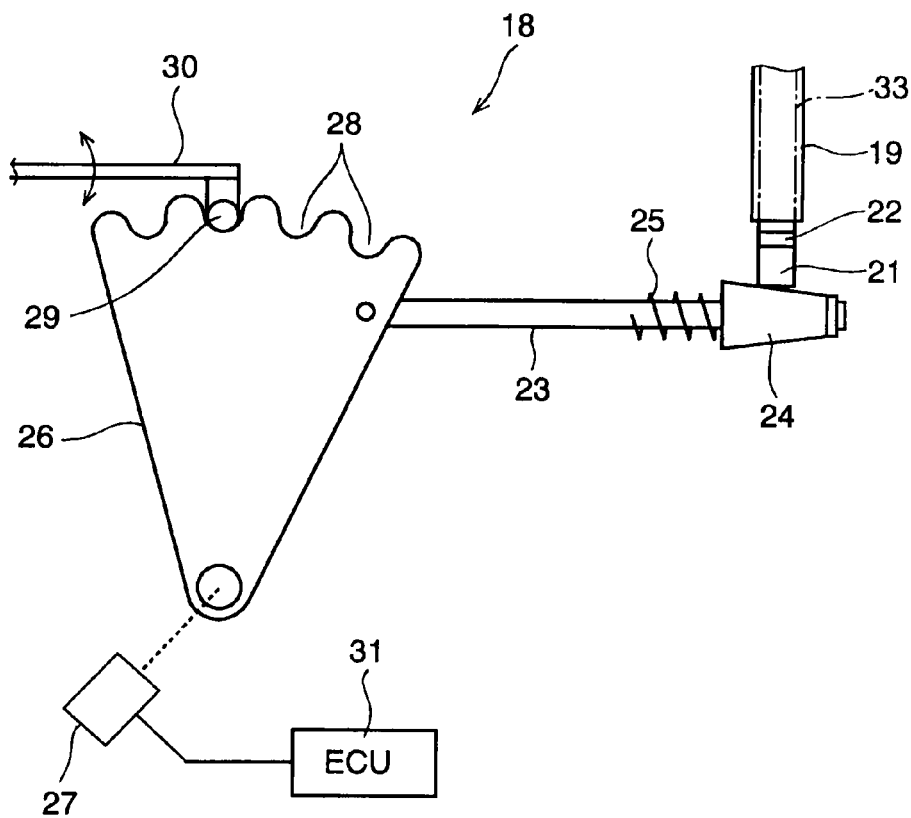
FIG. 4 is a view schematically showing one example of a parking mechanism.

A mechanism for moving the parking pawl 21 toward the parking gear 19 and away from the parking gear 19 is shown in FIG. 4. As shown in FIG. 4, a push rod 23 is arranged behind the parking pawl 21 (i.e., in an opposite side of the protrusion 22) in a manner to reciprocate parallel to a pivotal axis of the parking pawl 21, and a cam member 24 is attached to a leading end thereof in a manner to reciprocate thereon. Specifically, the cam member 24 is a truncated conical member, and an outer circumferential face thereof is contacted with a back face of the parking pawl 21. Therefore, in case the cam member 24 is moved forward, that is, to right side in FIG. 4, the parking pawl 21 is pushed pivotally so that the protrusion 22 is moved toward the parking gear 19.

More specifically, the cam member 24 is fitted onto the push rod 23 in a manner not to uncouple therefrom, while being pushed toward the leading end of the push rod 23 by a coil spring 25 also fitted onto the push rod 23. Therefore, in case the engagement recess 20 of the parking gear 19 is situated at a site where the protrusion 22 is not allowed to be inserted therein, that is, at a site where the parking pawl 21 cannot be pushed toward the engagement recess 20, only the push rod 23 is moved forward while compressing the coil spring 25 thereby applying an elastic force to the cam member 24. In this situation, when the engagement recess 20 reaches a site where the protrusion 22 is allowed to be inserted therein, the cam member 24 is pushed forward thereby pushing the parking pawl 21 toward the parking gear 19. That is, the example shown in FIG. 4 is configured not to generate stress between the parking pawl 21 and the cam member 24 excessively by withdrawing the cam member 24 relatively with respect to the push rod 23, in case the cam member 24 cannot be moved forward even if a thrust force is applied to the push rod 23 in its axial direction.

The push rod 23 is also connected with a detent plate 26. Specifically, the detent plate 26 is a plate member configured to be rotated by a motor 27, and a wavy surface is formed on its outer circumferential face. In other words, the detent plate 26 has same number of dents 28 as the number of shift positions on its outer circumferential face. Meanwhile, a pin 29 is attached to a flat spring 30 to be fitted into the dent 28. Therefore, in case of pushing the pin 29 into the dent 28 by an elastic force of the flat spring 30, a torque is applied to the detent plate 26 by the pin 29. To the contrary, in case the pin 29 is accommodated in the dent 28, a larger torque is required to rotate the detent plate 26. Therefore, the pin 29 can be fitted into the dent 28 while preserving snappy feeling at every shift positions when the detent plate 26 is rotated.

The push rod 23 is connected with the detent plate 26 at an intermediate portion or an outer circumferential portion of the detent plate 26. Therefore, the push rod 23 can be reciprocated together with the cam member 24 in accordance with the selected shift position.

In order to control the motor 27, and the motor generators 6 and 12 or (not shown) inverters thereof, the hybrid vehicle is provided with an electronic control unit (abbreviated as ECU) 31 composed mainly of a microcomputer. For example, electronic control unit 31 is configured to carry out a calculation on the basis of the a drive demand such as an opening degree of an accelerator, a vehicle speed, a shift position, a rotational speed of the engine and so on, and to output a calculation result in the form of a control signal.

As shown in FIG. 2, a shifting means 32 is connected electrically with the electronic control unit 31. Specifically, the shifting means 32 is adapted to select the shift position. For this purpose, the shifting means 32 is provided with switches for selecting the shift position, and a shift lever for activating the switches (both elements are not shown). Therefore, the shift position of the vehicle can be selected by operating the shift lever, from the drive positions for running the vehicle in the forward direction and for running the vehicle in the backward direction, the neutral position in which the engine 1 is driven but the torque thereof is not applied to the output member, the parking position to keep the vehicle parking, the B position for achieving a power source braking (i.e., an engine braking) and so on. However, the switch for selecting the parking position may be configured to be activated manually.

In case the parking position is selected in the vehicle thus structured, at least the first motor generator 6 is idled by interrupting an electrical transaction thereof. Consequently, the sun gear 4 of the planetary gear mechanism 2 functioning as the power distribution mechanism is idled and the torque is released therefrom. Thus, the torque is not applied to the ring gear 5 and the counter drive gear 7 under the parking position. In this situation, the output torque of the engine 1 being rotated is fluctuated and the engine 1 is thereby vibrated. As a result, the vibrations of the engine 1 are propagated to the transmission mechanism entirely. As described, the carrier 16 of the speed reducing mechanism 13 is fixed to the casing 17. Therefore, rattling of the transmission mechanism and rattling at the connection between the carrier 16 and the casing 17 are resonated to generate a noise of the vehicle itself.

Figure 1:
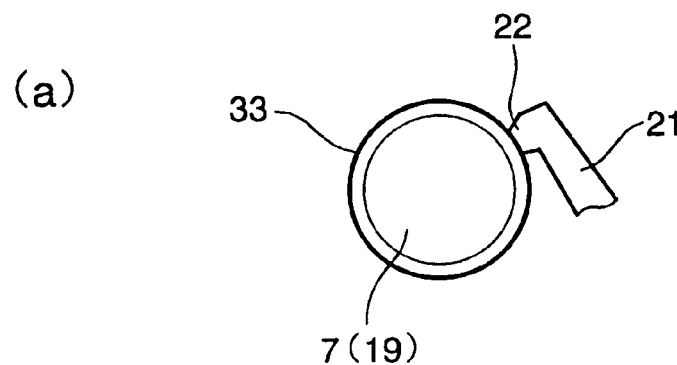
FIG. 1 is a view showing a positional relation between a friction member and a counter drive gear under the situations: (a) in which a drive position is selected; (b) in which a neutral position is selected; and (c) in which a parking position is selected.
Figure 1:
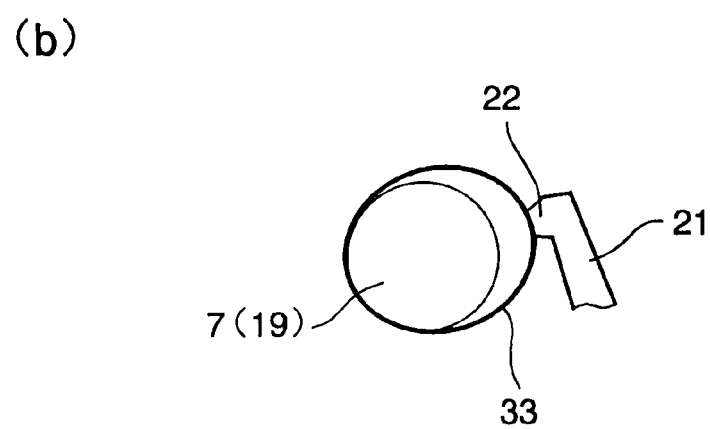
Figure 1:
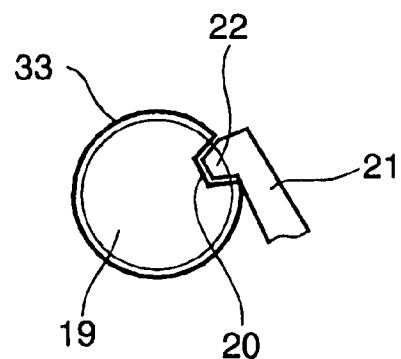

In order to prevent such rattling, the rattling noise reduction device according to the present invention is adapted to prevent or reduce the vibrations of the rotary member to which the torque is not being applied by applying a frictional force thereto. For this purpose, a friction member 33 is fitted loosely onto the rotary member to which the torque is not applied under the neutral position such as the counter drive gear 7 or the parking gear 19. According to the example, the friction member 33 serves as a part of the slidable contact means of the present invention, and the friction member 33 is attached to the parking pawl 21 which is moved to different positions in accordance with the selected shift position. Specifically, the friction member 33 is an annular member made of rubber. Therefore, the friction member 33 is kept into a substantially true circular shape or an oval shape under the condition in which a load is not applied to a specific portion thereof. In addition, an internal diameter of the friction member 33 is larger than an outer diameter of the counter drive gear 7 or the parking gear 19. Therefore, under the situation in which the friction member 33 is situated concentrically with the counter drive gear 7 or the parking gear 19, the friction member 33 enclosing the counter drive gear 7 or the parking gear 19 will not be contacted therewith at any portion as shown in FIG. 1(a).

An attachment position of the friction member 33 will be explained hereinafter in more detail. As shown in FIG. 1(a), a leading end of the protrusion 22 of the parking pawl 21 is bonded to a portion of an outer circumferential face of the friction member 33. In case the driving position such as a forward position (i.e., D position) or a reverse position (i.e., R position) is selected by the shifting means 32, the parking pawl 21 is withdrawn slightly away from the parking gear 19. As a result, the friction member 33 is situated concentrically with the counter drive gear 7 or the parking gear 19 without being contacted therewith. That is, a frictional braking force is not applied to the counter drive gear 7 or the parking gear 19 under the driving positions.

In case the neutral position is selected, the parking pawl 21 is further withdrawn from the counter drive gear 7 or the parking gear 19 by driving the aforementioned motor 27. Therefore, the friction member 33 is deformed eccentrically with respect to a center of the counter drive gear 7 or the parking gear 19 under the neutral position so that a portion of the inner circumferential face of the friction member 33 is frictionally contacted with the outer circumferential face of the parking gear 19 as schematically shown in FIG. 1(b).

To the contrary, in case the parking position is selected, the parking pawl 21 is pushed toward the parking gear 19 so that the protrusion 22 is fitted into the engagement recess 20. As described, the leading end of the protrusion 22 is bonded to the friction member 33. Therefore, in this situation, the protrusion 22 is inserted into the engagement recess 20 while buckling and pushing the friction member 33 into the engagement recess 20 as schematically shown in FIG. 1(c).

Specifically, the rattling noise reduction device of the present invention thus structured reduces the rattling under the neutral position by the following procedure. In case the driver selects the neutral position by operating the shifting means 32 under the condition in which the engine 1 is being driven, the motor 27 is driven to withdrawn the parking pawl 21 away from the parking gear 19. As a result, a portion of the friction member 33 opposite to the portion at which the protrusion 22 is bonded is pulled to be contacted with the counter drive gear 7 or the parking gear 19 thereby applying the braking force thereto, as shown in FIG. 1(b). In this situation, therefore, rotations of the counter drive gear 7 or the parking gear 19 and another rotary member connected therewith to transmit the torque are halted. Consequently, teeth of the gear will not hit against teeth of another gear meshing therewith even when the transmission mechanism is vibrated by the fluctuation of the engine torque so that the rattling can be reduced or damped. In addition, the rotation of the carrier 16 fixed with the casing 17 can also be halted. Therefore, the rattling at the connection between the carrier 16 and the casing 17 can also be reduced or damped.

In case the drive position is selected, the parking pawl 21 is pushed toward the parking gear 19 to the extent not to be contacted therewith, and the annular friction member 33 attached to the protrusion 22 is thereby situated substantially concentrically with the counter drive gear 7 or the parking gear 19 without being contacted therewith. Therefore, the braking force will not be applied to the counter drive gear 7 or the parking gear 19 when the vehicle is driven. For this reason, the fuel economy will not be degraded.

In case the driver selects the parking position by operating the shifting means 32 under the condition in which the vehicle is stopped, the parking pawl 21 is further pushed toward the parking gear 19 by the cam member 24 and the protrusion 22 thereof is fitted into the engagement recess 20 formed on the outer circumferential portion of the parking gear 19. As a result, rotations of the parking gear 19 and the counter drive gear 7 integrated therewith are halted to keep the vehicle stopping. As described, the friction member 33 is arranged around the parking gear 19 and attached to the protrusion 22 of the parking pawl 21. Therefore, in this situation, the friction member 33 is partially pushed into the engagement recess 20 by the protrusion 22 and interposed between the protrusion 22 and an inner face of the engagement recess 20. Thus, the protrusion 22 is not contacted directly with the inner face of the engagement recess 20. For this reason, metallic clank resulting from a direct contact between the protrusion 22 and the inner face of the engagement recess 20 can be prevented in the event of fitting the protrusion 22 is into the engagement recess 20, and in the event that the torque being applied to the counter drive gear 7 is fluctuated under the parking position. In addition, the friction member 33 interposed between the protrusion 22 and the inner face of the engagement recess 20 also functions as a buffering member. Therefore, in case the torque being applied to the counter drive gear 7 is fluctuated, such fluctuation of the torque is absorbed by the friction member 33 so that the shock can be further reduced or damped.

Thus, the rattling noise reduction device according to the present invention is configured to halt the rotation of the counter drive gear 7 or the parking gear 19 by contacting the friction member 33 therewith utilizing the parking pawl 21 which is moved by a shifting operation. Therefore, according to the present invention, the rattling noise under the neutral position can be reduced or damped without using an additional actuator.

In other words, the rattling noise reduction device according to the present invention is configured to contact a friction member to a rotary element to which the torque is not being applied under the neutral state by a member to be moved by selecting the neutral position. This means that the member to be moved to push the friction member onto the rotary member by selecting the neutral position should not be limited to the above-explained parking pawl. That is, another appropriate member to be moved in conjunction with a movement of the parking pawl may also be used to push the friction member onto the rotary member. In addition, the friction member is not necessarily an annular member such as a rubber ring. That is, any member adapted to apply a frictional force to the rotary member when contacted therewith while sliding can be used as the friction member. In addition, the rattling noise reduction device according to the present invention may also be used in a vehicle having a conventional automatic transmission instead of the hybrid vehicle.

The invention claimed is:

1. A rattling noise reduction device for a vehicle having a transmission mechanism configured to transmit a torque outputted from a prime mover to an output member through a mating transmission mechanism, and a shifting means adapted to select a drive position in which the torque outputted from the prime mover is transmitted to the output member, to select a neutral position in which the torque outputted from the prime mover is not transmitted to the output member, and to select a parking position for keeping the vehicle stopped, in which the transmission mechanism is configured to idle any one of rotary members thereof to prevent the torque from being applied to the output member in case the neutral position is selected, comprising:

a slidable contact means, which is contacted frictionally with the output member, or with a rotary member transmitting the torque to the output member; or with a member integrated with the rotary member, in case the neutral position is selected by operating the shifting means; and a parking mechanism having a parking gear which is rotated together with the rotary member, and a locking member which is moved toward the parking gear to be engaged therewith in a manner to halt a rotation of the parking gear by selecting the parking position, wherein:

the slidable contact means includes a friction member which is attached to the locking member, and which is contacted frictionally with the rotary member or the member integrated therewith in case the neutral position is selected and the locking member is thereby moved;

the shifting means includes a means adapted to select the parking position for keeping the vehicle stopped;

the rotary member includes the parking gear having an engagement recess which is rotated together with the output member;

the rattling noise reduction device further comprises the locking member having a protrusion, which is moved toward the parking gear thereby inserting the protrusion into the engagement recess in case the parking position is selected;

the locking member is moved to different positions depending on if the shift position selected by the shifting means is the drive position, the neutral position, or the parking position; and the slidable contact means includes an annular member, which is attached to a leading end of the protrusion of the locking member while being fitted loosely onto the parking gear, in a manner to be contacted with the rotary member in case the neutral position is selected so that the locking member is moved to a predetermined position, and in a manner not to be contacted with the rotary member in case the drive position is selected so that the locking member is moved to another predetermined position.

2. The rattling noise reduction device for a vehicle as claimed in claim 1, wherein:

the annular member is pushed partially into the engagement recess by the protrusion in the event that the protrusion is inserted into the engagement recess.

3. A rattling noise reduction device for a vehicle having a transmission mechanism configured to transmit a torque outputted from a prime mover to an output member through a mating transmission mechanism, and a shifting means adapted to select a drive position in which the torque outputted from the prime mover is transmitted to the output member, to select a neutral position in which the torque outputted from the prime mover is not transmitted to the output member, and to select a parking position for keeping the vehicle stopped, in which the transmission mechanism is configured to idle any one of rotary members thereof to prevent the torque from being applied to the output member in case the neutral position is selected, comprising:

a slidable contact means, which is contacted frictionally with the output member, or with a rotary member transmitting the torque to the output member; or with a member integrated with the rotary member, in case the neutral position is selected by operating the shifting means; and a parking mechanism having a parking gear which is rotated together with the rotary member, and a locking member which is moved toward the parking gear to be engaged therewith in a manner to halt a rotation of the parking gear by selecting the parking position, wherein:

the slidable contact means includes a friction member which is attached to the locking member, and which is contacted frictionally with the rotary member or the member integrated therewith in case the neutral position is selected and the locking member is thereby moved;

the locking member is moved to different positions depending on if the shift position selected by the shifting means is the drive position, the neutral position, or the parking position; and the frictional member includes an annular member, which is fitted loosely onto the rotary member in a manner to be contacted with the rotary member in case the neutral position is selected so that the locking member is moved to a predetermined position, and in a manner not to be contacted with the rotary member in case the drive position is selected so that the locking member is moved to another predetermined position.

4. The rattling noise reduction device for a vehicle as claimed in claim 3, wherein the annular member includes a rubber ring.

5. The rattling noise reduction device for a vehicle as claimed in claim 3, wherein:

the prime mover includes an internal combustion engine; and the mating transmission mechanism comprises: a differential mechanism configured to perform a differential action among an input element connected with the internal combustion engine, and a reaction element and an output element connected with a first electric motor; and a gear for transmitting the torque from the output element to the output member.

6. The rattling noise reduction device for a vehicle as claimed in claim 5, further comprising:

a second electric motor; and a gear mechanism arranged between the second electric motor and the output element.

7. The rattling noise reduction device for a vehicle as claimed in claim 6, wherein:

the gear mechanism includes a speed reducing mechanism configured to amplify torque of the second electric motor, and to transmit the amplified torque to the output element.

8. The rattling noise reduction device for a vehicle as claimed in claim 7, wherein:

the speed reducing mechanism includes a planetary gear mechanism in which a carrier thereof is fixed to a casing.

9. The rattling noise reduction device for a vehicle as claimed in claim 7, wherein:

both of the electric motors are idled in case the neutral position is selected.

* * * * *